United States Patent [19]

Huber et al.

[11] Patent Number: 5,424,833
[45] Date of Patent: Jun. 13, 1995

[54] INTERFERENTIAL LINEAR AND ANGULAR DISPLACEMENT APPARATUS HAVING SCANNING AND SCALE GRATING RESPECTIVELY GREATER THAN AND LESS THAN THE SOURCE WAVELENGTH

[75] Inventors: Walter Huber, Traunstein; Michael Allgauer, Stein/Traun, both of Germany

[73] Assignee: Dr. Johannes Heidenhain GmbH, Traunreut, Germany

[21] Appl. No.: 125,110

[22] Filed: Sep. 21, 1993

[30] Foreign Application Priority Data

Sep. 21, 1992 [DE] Germany .......................... 92116125.3
Sep. 21, 1992 [DE] Germany .......................... 92116126.1

[51] Int. Cl.⁶ .............................................. G01B 9/02
[52] U.S. Cl. .................................... 356/356; 356/363; 250/237 G
[58] Field of Search ............................ 356/356, 363; 250/237 G, 231.14

[56] References Cited

U.S. PATENT DOCUMENTS 4,360,273 11/1982 Thaxter ............................... 356/363
4,776,701 10/1988 Pettigrew .
5,009,506 4/1991 Spies .
5,104,225 4/1992 Masreliez ............................ 356/356
5,180,910 1/1993 Spratte et al. ................... 250/237 G
5,214,280 5/1993 Rieder ............................ 250/237 G

FOREIGN PATENT DOCUMENTS

0163362B1 6/1988 European Pat. Off. .
033929 12/1988 European Pat. Off. .
446691 2/1991 European Pat. Off. .
2316248 3/1973 Germany .
2095399 9/1982 United Kingdom .

OTHER PUBLICATIONS

Willhelm, Jörg, "Dreigitterschrittgeber, Photoelektrische Aufnehmer Zur Messung von Lageänderungen," pp. 1–96, 1978.

Primary Examiner—Samuel A. Turner
Attorney, Agent, or Firm—Willian Brinks Hofer Gilson & Lione

[57] ABSTRACT

An interferential apparatus and method for measuring displacement in which phase displaced signals may be generated by the proper selection of a light source and the division periods of a plurality of gratings.

36 Claims, 6 Drawing Sheets

INTERFERENTIAL LINEAR AND ANGULAR DISPLACEMENT APPARATUS HAVING SCANNING AND SCALE GRATING RESPECTIVELY GREATER THAN AND LESS THAN THE SOURCE WAVELENGTH

Applicant hereby incorporates the entire contents of European Application Nos. 92116125.3 and 2116126.1, both filed Sep. 21, 1992 by reference.

FIELD OF THE INVENTION

The invention relates to an optical device, in particular a length or angle measuring arrangement. More particularly, an interferential arrangement for generating phase displaced signals.

BACKGROUND OF THE INVENTION

Interferential length and angle measuring devices (also referred to herein as "arrangement") are known from many references. For example, U.S. Pat. No. 4,776,701 (Pettigrew), the entire contents of which are incorporated herein by reference, shows a three-grating interferometer, which in practical applications is reduced to a two grating structure by making one of the gratings reflective. Evaluating the interfering partial beams makes it possible to measure the magnitude and direction of the relative displacement between the two gratings. A phase displacement between the partial beams detected by the detectors is therefore necessary.

German Patent Application DE 23 16 248 A1 (Leitz) discloses an apparatus for measuring displacement that has one transparent and one reflective grating. Three detectors detect the diffraction groups of the zero order and of the positive and negative second order. A clear disclosure of the phase relationships between the light beams detected by the detectors, which do not detect the diffraction groups of the first order, is lacking.

SUMMARY OF THE INVENTION

An object of the present invention to disclose a measuring instrument with very high resolution and generous tolerance in alignment, using fine gratings with a division period on the order of magnitude of a half-micrometer on the scale grating. Other desirable features are high degrees of modulation, the absence of signal harmonics, and a simple, compact structure with the capability of generating the phase-displaced signals by various methods.

The particular advantages are that measurements can be made using a scale grating having a very fine division period thereby attaining high resolution even before signal interpolation.

The invention itself, together with objects and attendant advantages, will best be understood by reference to the following detailed description taken in conjunction with accompanying drawings. It should be understood, however, that this description is to be illustrative rather than limiting, the scope of the invention being defined by the appended claims and equivalents thereof.

DETAILED DESCRIPTION OF THE PRESENTLY PREFERRED EMBODIMENTS

Figure 1:
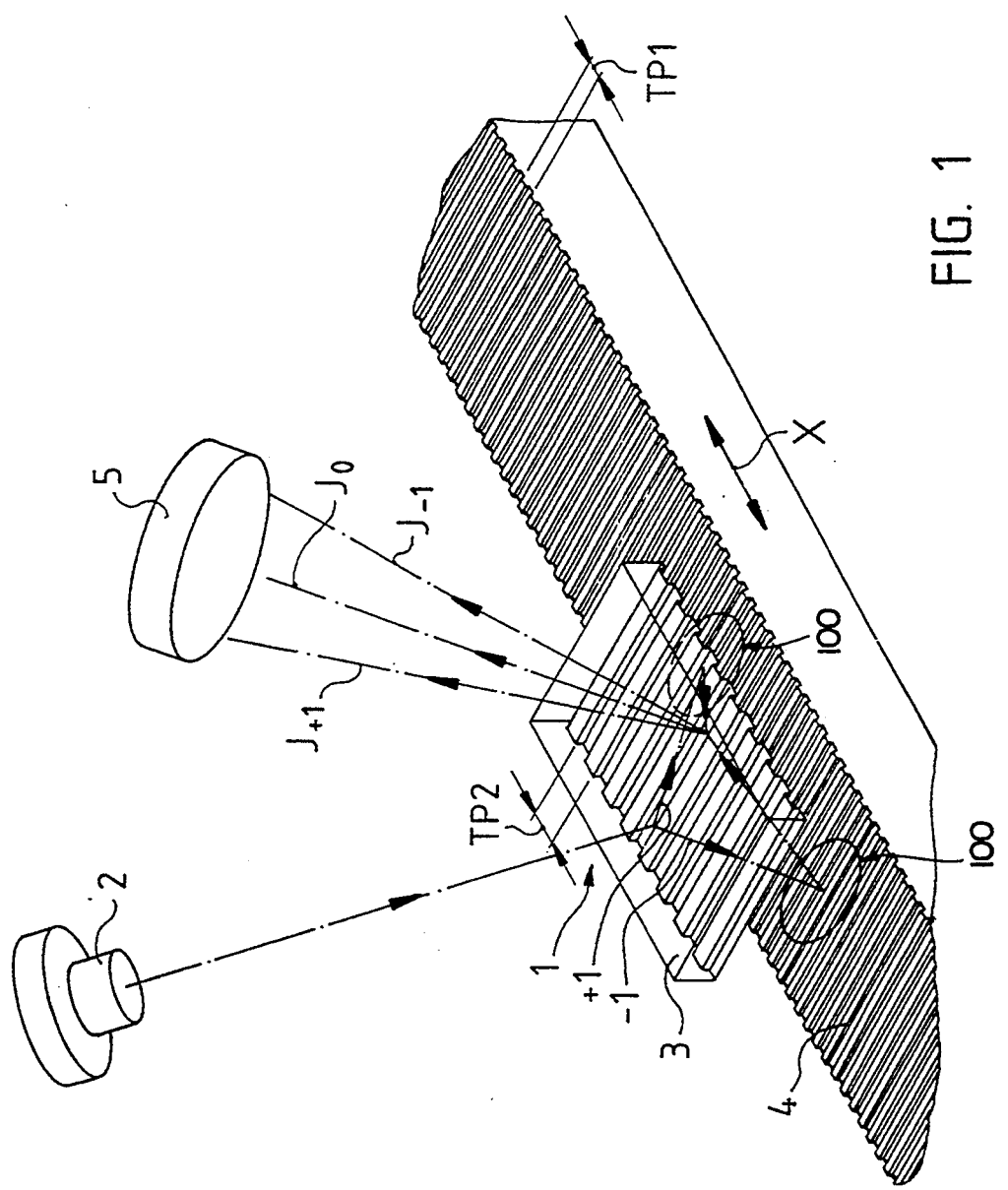
FIG. 1 is a perspective view of an arrangement for measuring displacements according to a first embodiment of the present invention.

FIG. 1 is a perspective view of an arrangement for measuring displacements according to a first embodiment of the present invention. The arrangement 1 includes a light source 2, a scanning or index grating 3, a reflective scale grating 4, and a photodetector 5. In a preferred embodiment, the light source 2, scanning grating 3 and photodetector 5 are mounted on a reading head (not shown) that is displaceable relative to the reflective scale grating 4. The electrical output signals of the photodetector 5 provide a measure of the direction and magnitude of displacement of the reading head relative to the scale grating 4. Linear and angular incremental displacements between scanning grating 3 and reflective scale grating 4 can be measured.

In a preferred embodiment, the light source 2 emits a beam having specific coherence properties. In a most preferred embodiment, the light source 2 is provided by a light-emitting diode (LED).

The scanning grating 3 has a division period TP2 that is about twice as great as the division period TP1 of the scale grating 4. Preferably the division period TP1 is less than the wavelength of the light source 2 while the division period TP2 is greater than the wavelength of the light source 2. A division period includes one ridge and one groove as illustrated in FIG. 1. In a preferred embodiment the ratio of TP2 to TP1 is precisely 2:1. In another preferred embodiment, the ratio of TP2 to TP1 is about but not precisely 2:1. For example, if fine gratings are used in which the scale grating 4 has a division period TP1 of about 0.5 μm, the scanning grating 3 has a division period TP2 of about 0.9982 μm. Alternatively, coarser gratings may be used such as a division period TP1 of 1 μm and a division period TP2 of 1.0018 μm.

As illustrated, the scale grating 4 and the scanning grating 3 are disposed parallel to one another and relative movement between the two occurs along a measuring direction indicated by the arrow X. The light beam from the light source 2 is split at the scanning grating 3 into two first diffraction order −1 and +1 beams. Scanning grating 3 is configured such that no zero order diffraction arises. This preferred arrangement may be implemented in a known manner by the proper configuration of the surface of grating 3. The two first diffraction orders extend symmetrically from an axis defined by the incident beam of light.

The two first diffraction order −1 and +1 beams impinge upon reflective scale grating 4. Because of the ratios previously described between the division periods TP2 and TP1 of the scanning grating 3 and the scale grating 4 respectively, only two diffracted partial beams are created at grating 4. These partial beams converge back in themselves precisely or approximately. More particularly, the partial beams reflected from scale grating 4 follow substantially the same path as the partial beams striking the scale grating 4 from the scanning grating 3. The partial beams created at scale 4 are brought into interference at the scanning grating 3.

If the ratio of division periods TP2/TP1 is about 2:1, these partial beams interfere by diffraction at the scanning grating 3 in easily distinguished directions and generate in the focal plane of a lens (not shown) an interference band system, from which the desired phase-offset output signals can be derived by means of a structured detector. A detailed description of a measuring instrument operating on this principle will be described hereinafter with reference to FIGS. 5–9.

If the ratio of division periods TP2/TP1 is precisely 2:1, these partial beams interfere by diffraction at the scanning grating 3 in precisely identical directions and thus, upon motion of the scale grating 4 relative to the scanning grating 3, produce intensity modulations in the resultant signals beams $J_0$, $J_{+1}$, $J_{-1}$, whose mutual phase offset, preferably 120°, is achieved by suitable configuration of the scanning grating 3.

Figure 2:
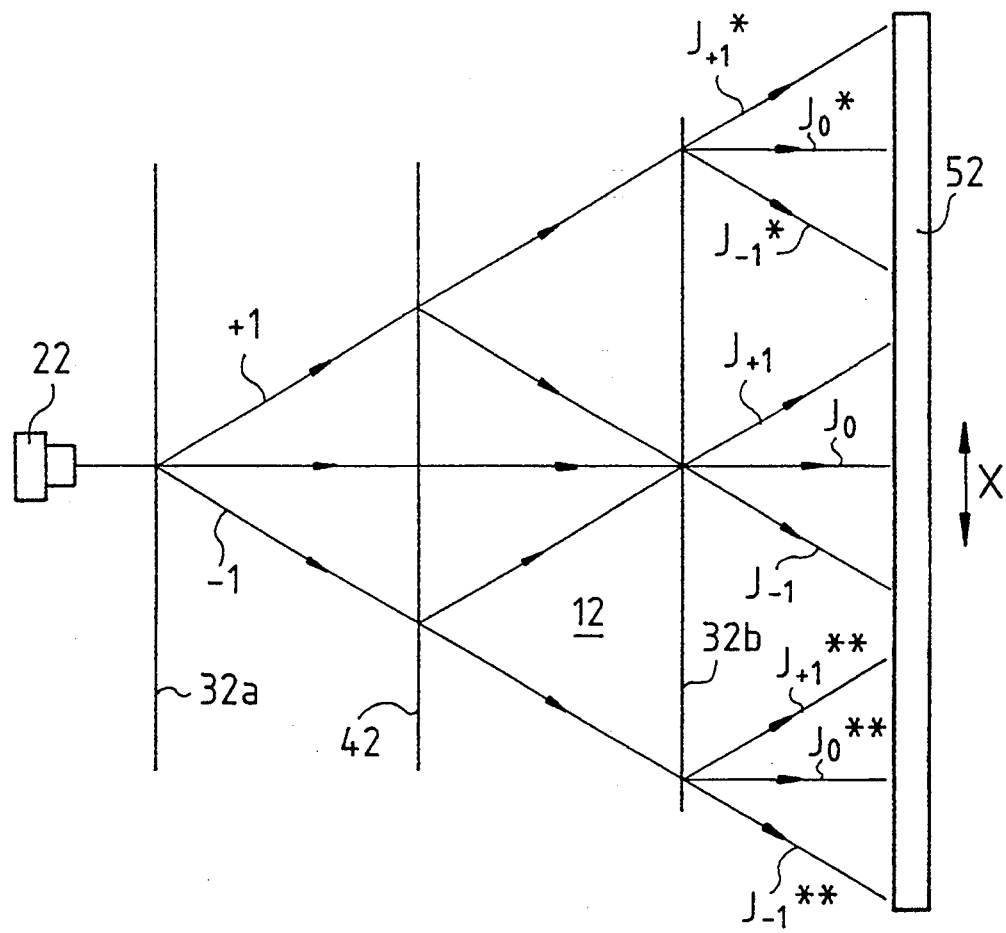
FIG. 2 is an "unfolded" diagram of an arrangement according to a second embodiment of the present invention.

FIG. 2 is an "unfolded" diagram of an arrangement according to a second embodiment of the present invention. The arrangement includes a light source 22, a first or splitting grating 32a, a scale grating 42, a third, or combining grating 32b and a detector 52. Preferably the light source 22 is a light emitting diode. The scale grating 42, which is really reflective, is shown as a transmissive grating for ease of illustrating the paths taken by the partial beams, The first and third gratings 32a and 32b are in actuality formed on a single scanning plate as shown in FIG. 1. They have been illustrated as spatially separated so that the functions of splitting and combining are more readily apparent.

A beam of light emitted by light source 22 falls onto the first grating 32a perpendicular to the plane defined by the first grating 32a, at which partial beams of the 0 and ±1 orders are generated by diffraction. These partial beams fall on scale grating 42 where they are diffracted again. The scale grating 42 diffracts the beams into zero and first order beams. The beams created at grating 42 are diffracted toward the grating normal and meet one another at the combining grating 32b where they enter into interference.

The temporal coherence properties of the light source 22 are such that the partial beam of the zero diffraction order created at the splitting grating 32a does not contribute to the interference since it travels a different optical distance between the three gratings 32a, 42 and 32b from the distance travelled by the two beams of the ±1 diffraction orders.

The spatial coherence properties of the light source 22 are such that the partial beams of the zero diffraction orders produced at the scale grating 42 from the partial beams of the ±1 diffraction orders created at the splitting grating 32a, likewise do not contribute to the interference, since they arrive at the combining grating 32b with an offset in the measuring direction X. Hence only those partial beams that not only travel equal optical distances between the gratings but also are superimposed at the combining grating 32b without offset in the measuring direction X contribute to the interference.

Figure 3:
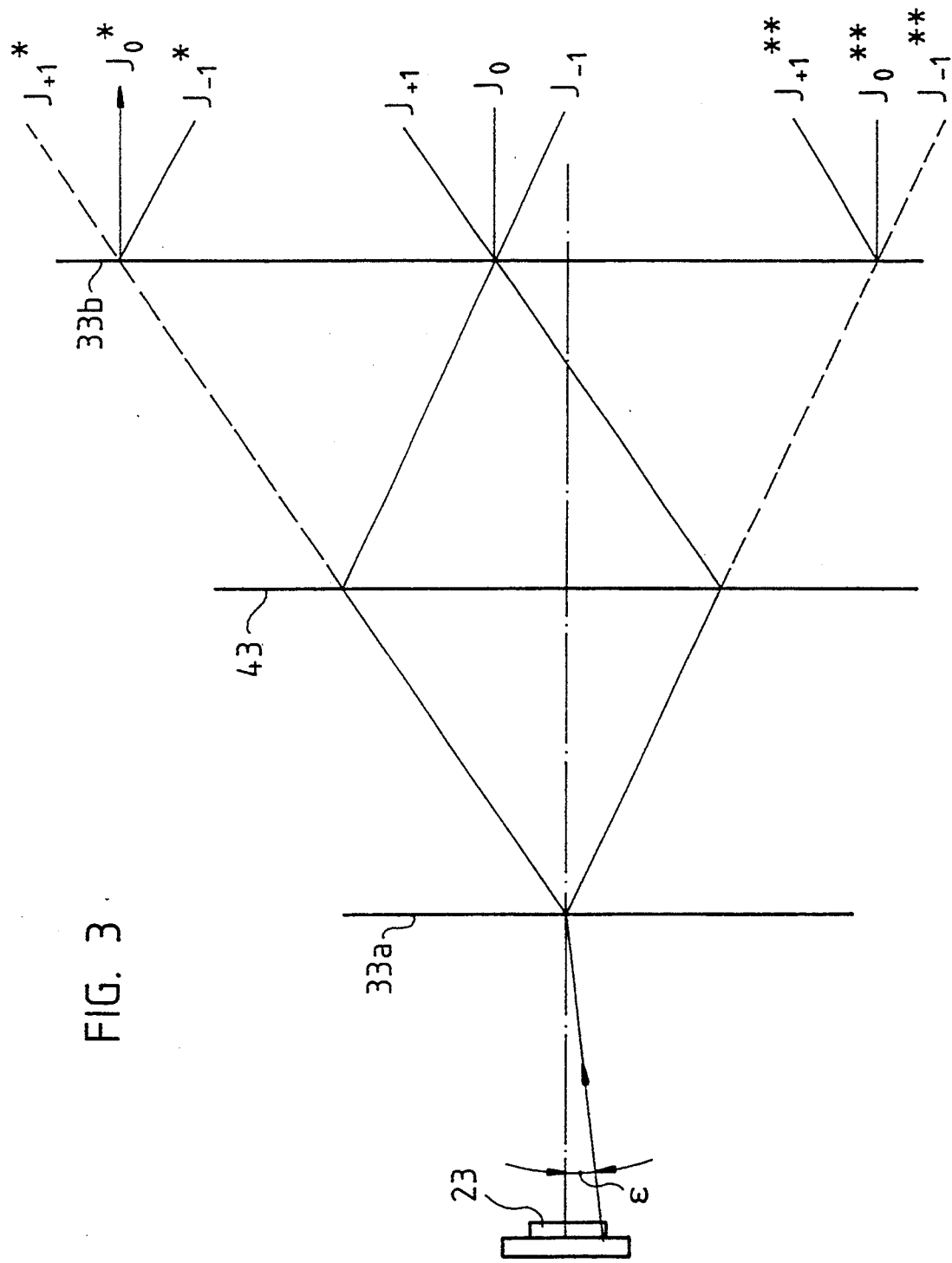
FIG. 3 is an "unfolded" diagram of an arrangement according to a third embodiment of the present invention.

FIG. 3 is an "unfolded" diagram of an arrangement according to a third embodiment of the present invention. The arrangement includes a light source 23, a first grating 33a, a scale grating 43 and a third grating 33b. Unlike the first and third gratings of FIG. 2 the first and third gratings 33a and 33b in FIG. 3 are preferably physically separate in actuality. In addition, unlike the light source of FIG. 2, the light source 23 is elongated and thus the beam of light from light source 23 impinges upon grating 33a at an angle e instead of perpendicularly. As can easily be seen, the optical travel length of the signal-forming partial beams $J_0$, $J_{+1}$, and $J_{-1}$ as illustrated by the parallelogram in the center of the FIG. 3 is the same as the optical travel length of the signal-forming partial beams shown in FIG. 2. These partial beams thus generate interferences of equal phase regardless of the angle e of illumination. The arrangement is therefore not as sensitive to variation in the angle of illumination thereby providing greater accuracy.

The optical travel lengths of the partial beams of the zero diffraction order originating at the scale grating 43 from the partial beams of the ±1 diffraction orders of the splitting grating 33a, conversely, are different for different angles of illumination. A mixture of many incident directions by means of an elongated light source thus leads to a superimposition of interferences of arbitrary phase. For this reason, the partial beams $J_0^*$, $J_{+1}^*$, $J_{-1}^*$ and $J_0^{}$, $J_{+1}^{}$, $J_{-1}^{**}$ shown in FIGS. 2 and 3 generate only a constant equal-light component on the detector.

Since in this embodiment the first and third gratings are not physically identical, their grating parameters may be selected such that they can optimally perform their tasks as the splitting grating and as the combining grating.

Figure 4:
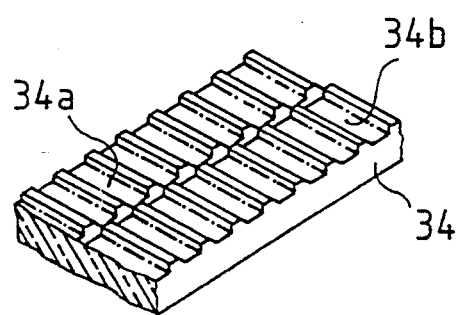
FIG. 4 is a schematically shown scanning plate with two different grating structures.

While the arrangements discussed with reference to FIGS. 1–3 have used a light transmissive grating 3, the arrangement of the present invention may be used with an incident light source. FIG. 4 illustrates a scanning grating 34 which may replace grating 3 of FIG. 1. The scanning grating 34 has two zones with different grating structures 34a and 34b, which are optimized for their tasks as the splitting grating 34a and the combining grating 34b. Referring to the arrangement illustrated in FIG. 1, grating 3 is replaced by grating 34 so that the splitting grating 34a and the combining grating 34b face grating 4. The light source 2 would be located between the two gratings 34 and 4 so, that a beam of light emitted from source 2 would impinge upon splitting grating 34a.

With a length or angle measuring instrument in accordance with the invention, it is possible, on the condition that the division period TP1 of the scale grating 4 is smaller than the wavelength of the light used, to generate harmonics-free signals with the period TP1/TP2 solely by means of the coherence properties of the light source 2.

Figure 5:
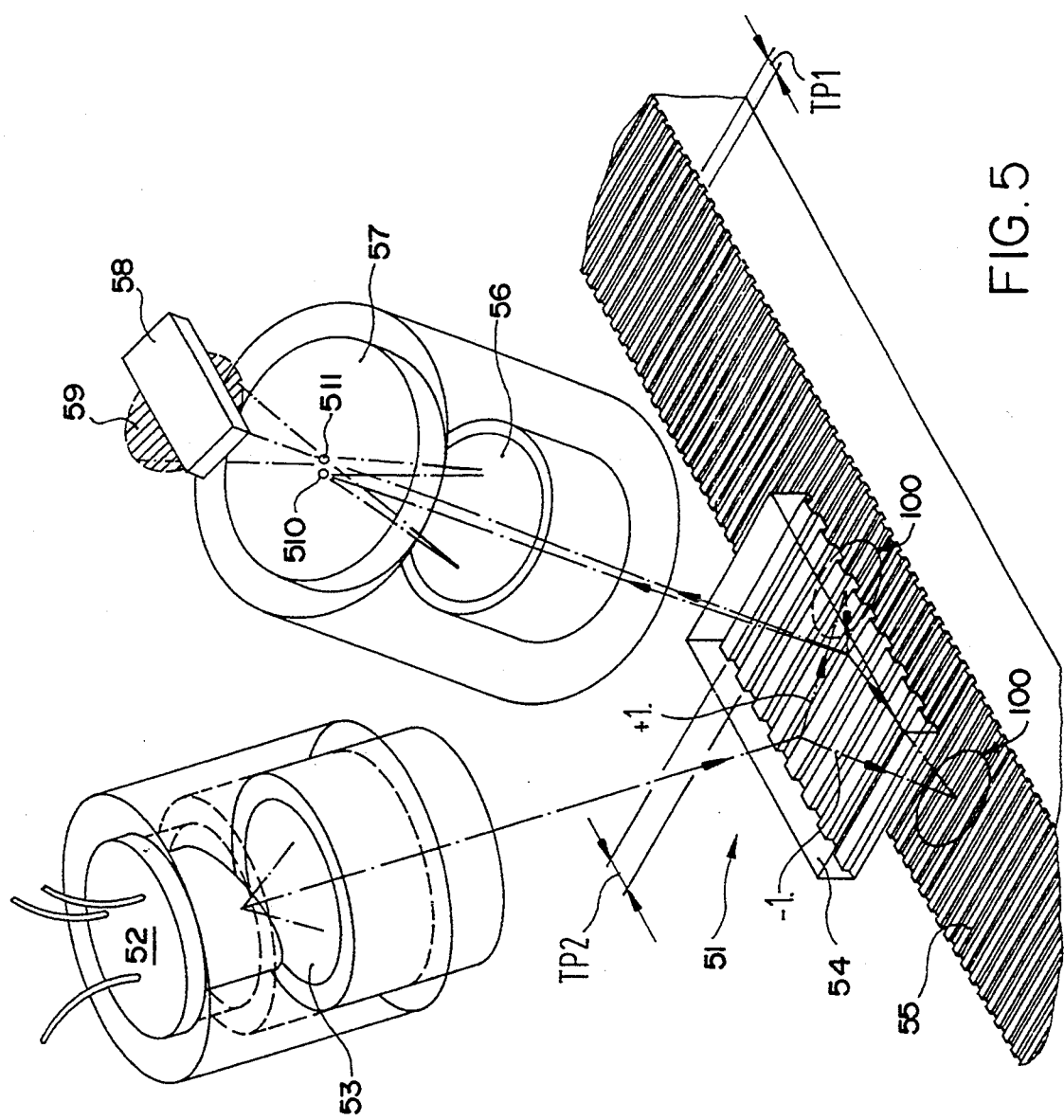
FIG. 5 is a perspective view of an arrangement for measuring displacements according to a fourth embodiment of the present invention.

FIG. 5 is a perspective view of an arrangement for measuring displacements according to a fourth embodiment of the present invention. The arrangement 51 includes a light source 52, a collimator 53, a scanning or index grating 54, a reflective scale grating 55, a focusing lens 56, a ring screen 57 and a photodetector 58, preferably a structured detector, for detecting an interference band system 59. In a preferred embodiment, the light source 52, collimator 53, scanning grating 54, lens 56, screen 57 and photodetector 58 are mounted on a reading head (not shown) that is displaceable relative to the reflective scale grating 55. The electrical output signals of the photodetector 58 provide a measure of the direction and magnitude of displacement of the reading head relative to the scale grating 55.

While the arrangement shown in FIG. 5 is used to measure linear incremental displacements between the scanning grating 54 and reflective scale grating 55, the arrangement can be used to measure angular incremental displacements as well.

In a preferred embodiment, a spot-type light source 52 is used such as a laser diode, which emits light at a wavelength of about 780 nm, for example.

The scanning grating 54 has a division period TP2 that is about twice, but not exactly, twice as great as the division period TP1 of the scale grating 55 the division period TP1 being less than the wavelength of the light source 52 and the division period TP2 being greater than the wavelength of the light source 52. A division period includes one ridge and one groove as illustrated in FIG. 5. In a more preferred embodiments, fine gratings are used in which the scale grating 55 has a division period TP1 of about 0.5 µm, and the scanning grating 54 has a division period TP2 of about 0.9982 µm. Alternatively, coarser gratings may be used such as a division period TP1 of 1 µm and a division period TP2 of 1.0018 µm. The scanning grating 54 and scale grating 55 may be amplitude and/or phase gratings.

As illustrated in FIG. 5, the scale grating 55 and the scanning grating 54 are disposed parallel to one another and relative movement between the two occurs along a measuring direction indicated by the arrow. The light beam from the light source 52 is split at the scanning grating 54 into two first diffraction order (±1) beams. Scanning grating 54 is preferably configured such that a zero order diffraction beam is not created. This preferred arrangement may be implemented in a known manner by the proper configuration of the surface of grating 54. The two first diffraction order beams extend symmetrically from an axis defined by the incident beam of light.

Because of the ratios previously described between the division periods TP2 and TP1 of the scanning grating 54 and scale grating 55 respectively, only two diffracted partial beams are created at grating 55. These beams when viewed in the line direction (see FIG. 6), virtually converge upon themselves, i.e., the two reflected partial beams of the −1 and +1 orders form virtually the same angle with reference to the normal of the scale grating 55 as the incident partial beams from scanning grating 54.

After further diffraction at the scanning grating 54, the partial beams that have passed through have virtually parallel directions, however, a small angle or shearing between the diffracted partial beams exists due to a slight deviation of the ratio of the division periods TP2/TP1 from an integral ratio, such as 2:1. This deviation results in two foci 510 and 511 produced in the focal plane of the focusing lens 56. In a preferred embodiment, focusing lens 56 is a gradient index lens. The slight shearing that occurs between the partial beams is better illustrated in FIG. 6.

Figure 8A:
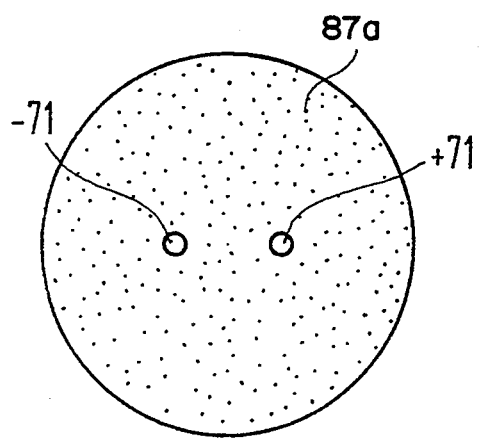
FIG. 8a illustrates a ring screen according to a preferred embodiment of the present invention.
Figure 8B:
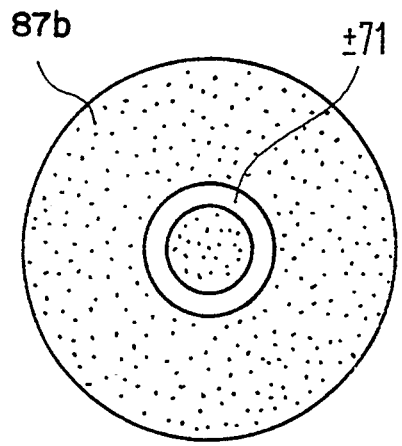
FIG. 8b illustrates a ring screen according to another preferred embodiment of the present invention.

The spherical waves originating at the foci 510 and 511 generate an interference band system 59 that is detected with the detector 58. A ring screen 57 screens out other diffraction orders and scattered light from reaching the detector 58. Examples of various screens are shown in FIGS. 8a and 8b, which will be described in further detail hereinafter. Thus by making the ratio of division periods TP2/TP1 about 2:1 but not exactly 2:1, the partial beams that interfere by diffraction at scanning grating 54 do so in easily distinguished directions and in the focal plane of lens 56 generate an interference band system 59 from which the desired phase-offset output signals are derived using a structured detector 58.

In addition, at least one waveguide (not shown) may be mounted at the location of a respective foci. The waveguide carries the partial beams located at the foci to a 2×3 coupler as is well known by those skilled in the art.

The light source 52 and the detector 58 of the arrangement shown in FIG. 5 are located in a plane at right angles to the measuring direction and symmetrical about the normal of scale grating 55. Other arrangements may be used as will be described with reference to FIG. 6.

Figure 6:
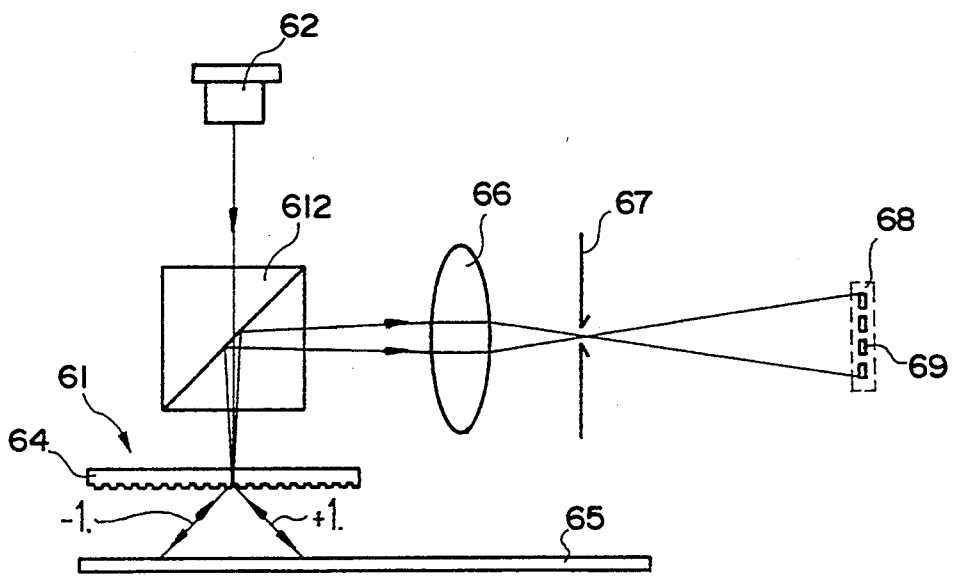
FIG. 6 is a schematic diagram of an arrangement according to a fifth embodiment.

FIG. 6 is a schematic diagram of a measuring arrangement according to a fifth embodiment. In the arrangement of FIG. 6, a laser diode 62 and a detector 68 are also disposed in one plane, however, this plane is defined by a component in the measuring direction and a component normal to the scale grating 65.

A beam splitter 612 is located in the beam path between the laser diode 62 and the detector 68. In this embodiment it can be clearly seen that the first order diffracted partial beams ±1, after reflection off the Scale grating 65, converge upon one another and after another diffraction at the scanning grating 64 arrive with a small angle or shearing between the beams so that they are not completely parallel at the beam splitter 612. The beam splitter 612 deflects the partial beams onto a lens 66, where they are focused and projected onto a screen 67. After the partial beams admitted for evaluation have passed through the screen 67, they strike a detector 68 where an interference band system 69 is detected. The lens 66 and screen 67 will be described in greater detail with reference to FIG. 9.

Figure 7:
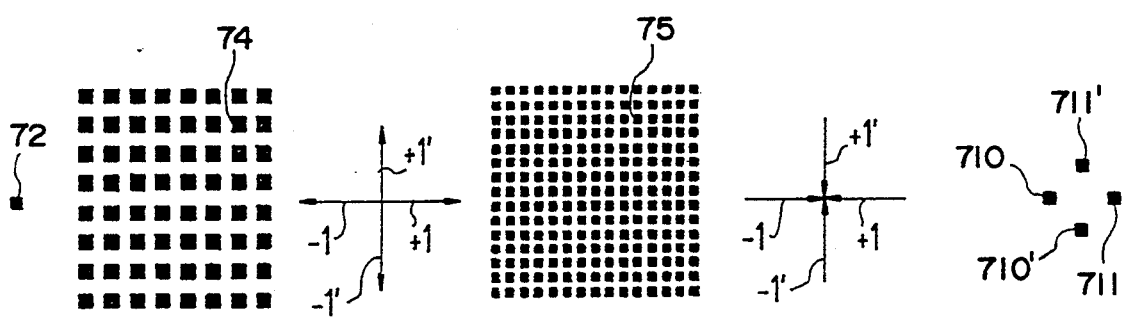
FIG. 7 is an "unfolded" diagram of a portion of a measuring instrument according to a sixth embodiment of the present invention.

FIG. 7 is an "unfolded" diagram of a portion of a measuring instrument according to a sixth embodiment. The scanning and scale gratings described with reference to FIGS. 1–6 are designed to measure displacements in one dimension. Those gratings can be replaced by scanning grating 74 and scale grating 75 shown in FIG. 7 which allow displacement measurements in two dimensions.

Both the scanning grating 74 and the scale grating 75 have a grating division in two coordinate directions and thus are known as cross gratings. More specifically, grating 74 has a division period TP2 previously described in two coordinate directions and grating 75 has a division period TP1 previously described in two coordinate directions. The remainder of the arrangement (now shown) is similar to those previously described and therefore reference is made to the above description to avoid repetition.

The scanning and scale gratings of the measuring arrangements previously described may be replaced with cross gratings as described to measure displacements in two dimensions.

Referring back to FIG. 7, dot 72 symbolizes a light beam emitted by a light source (not shown) which in this unfolded illustration strikes the scanning grating 74. At the scanning grating 74, the light beam 72 is split into −1 and +1 as well as −1' and +1' partial beams. The beams are symbolically shown after the scanning grating 74 as extending at right angles to one, another. These diffracted partial beams are reflected and diffracted again at the scale grating 75. The again-diffracted −1, +1, −1', +1' partial beams are symbolically shown after the scale grating 75. In comparison with the embodiments illustrated in FIGS. 5 and 6, four foci, which are schematically represented by dots 710, 711 and 710', 711' appear in the focal plane of a lens (not shown).

The ring screen 57 shown in FIG. 5 may have various constructions. FIG. 8a illustrates a ring screen 87a according to one preferred embodiment. The screen 87a has two light-transmissive regions −71 and +71, through which the slightly sheared partial beams can pass.

FIG. 8b illustrates a ring screen 87b according to another preferred embodiment. In this embodiment, the light-transmissive region ±71 is annular thereby making adjustment and alignment of the optical components easier.

Figure 9:
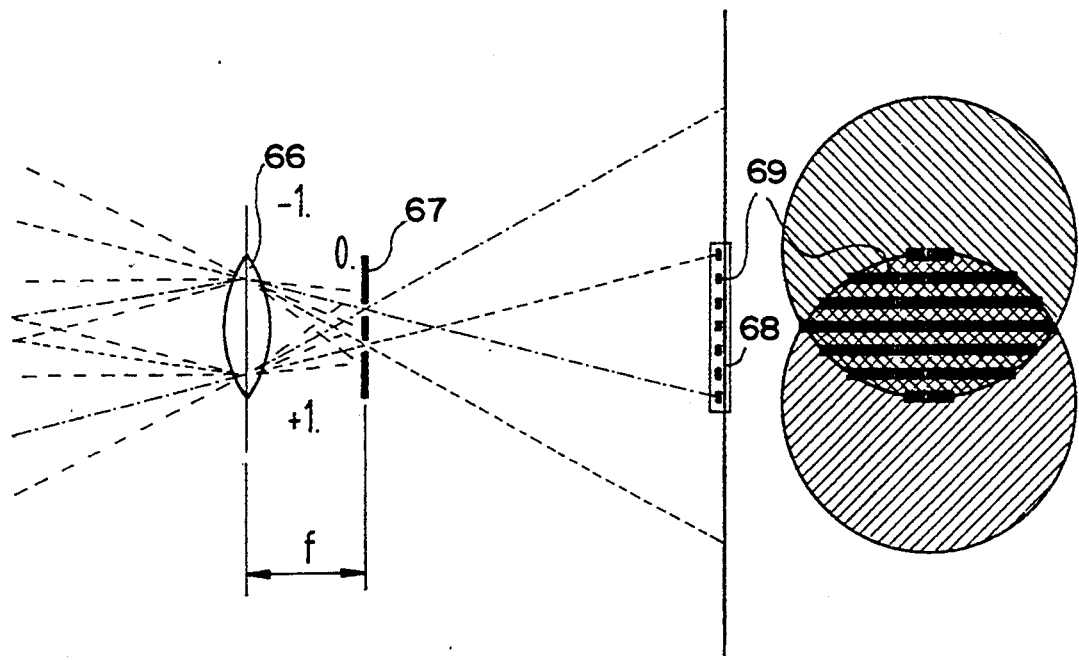
FIG. 9 is a schematic of a portion of the measuring arrangement illustrated in FIG. 6.

FIG. 9 is a schematic of a portion of the measuring arrangement shown in FIG. 6. More particularly, the lens 66, screen 67, detector 68 and interference band system 69 are illustrated in greater detail. It becomes clear that with the aid of the screen 67, all the diffraction orders except for −1 and +1 beams are filtered out. The spacing between the lens 66 and screen 67 designated by the letter "f" indicates that the screen 67 is located in the focal plane of the lens 66.

Phase-displaced signals can be obtained not only by suitable dimensioning of the scanning grating or by evaluation of an interference band system by means of a structure detector, but also by polarization optics 100.

While this invention has been shown and described in connection with the preferred embodiments, it is apparent that certain changes and modifications, in addition to those mentioned above, may be made from the basic features of the present invention. Accordingly, it is the intention of the Applicant to protect all variations and modifications within the true spirit and valid scope of the present invention.

What is claimed is:

1. An interferential displacement measuring instrument having a plurality of gratings that are displaceable in a measuring direction relative to one another which diffract a light beam coming from a light source of a particular wavelength and also cause the diffracted partial beams to enter into interference, wherein the intensity modulations of the partial beams resulting from interference are converted by at least one detector into electrical signals phase-displaced from one another, the plurality of gratings comprising:
   a scale grating having a first division period (TP1) that is less than the wavelength of the light source; and
   a scanning grating having a second division period (TP2) that is greater than the wavelength of the light source, the light source having temporal coherence properties that allow interference only of partial beams that travel equally long optical distances between the scanning and scale gratings and spatial coherence properties that allow interference only of those partial beams that in a final passage through the scanning grating are superimposed without offset in the measuring direction.

2. The instrument according to claims 1, wherein the scale and scanning gratings have index lines extending in a line direction and the light is polarized in a polarization plane by means of a polarizer in the line direction of the gratings or at right angles thereto.

3. The instrument according to claim 2, wherein the polarization plane of the light is rotated between the gratings by means of a half-wave plate.

4. The instrument according to claim 1, wherein the light source is projected onto the detector by means of a convergent illuminating beam path.

5. The instrument according to claim 1, wherein the phase-displaced signals are obtained by varying grating parameters of the scanning grating.

6. The instrument according to claim 1, wherein the phase-displaced signals are generated by polarization optics.

7. The instrument according to claim 1, wherein the phase-displaced signals are obtained by the evaluation of an interference band pattern by means of a structured detector.

8. The instrument according to claim 1, wherein the scanning grating splits the light beam into partial beams which extend symmetrically about the axis of the incident beam of light.

9. The instrument according to claim 1, wherein the scanning grating includes a splitting grating and a combining grating.

10. The instrument according to claim 9, wherein the splitting and combining gratings are transparent and physically identical, and the scale grating is reflective.

11. The instrument according to claim 9, wherein the splitting and combining gratings are disposed on a common scanning plate, the splitting grating having different grating parameters from the combining grating.

12. The instrument according to claim 1, wherein the scanning and scale gratings are transparent.

13. The instrument according to claim 12, wherein the scanning grating includes a splitting grating and a combining grating, the splitting grating and the combining grating having different grating parameters.

14. The instrument according to claim 1 wherein the scale and scanning gratings are formed by phase and amplitude gratings.

15. The instrument according to claim 1 wherein the scanning and scale gratings are formed by cross gratings.

16. The instrument according to claim 15, wherein the cross gratings allow the measuring instrument to measure displacement in two dimensions.

17. An apparatus according to claim 1 further comprising:
   a lens having a focal plane, the lens positioned between the scanning grating and the detector wherein the first division period and the second division period are chosen to create a slight shearing of the beams emitted towards the detector from the scanning grating to create a plurality of foci.

18. An apparatus according to claim 7 wherein the interference band system is created by the first order (±1) of partial beams created by the interference.

19. An apparatus according to claim 17 wherein the lens comprises a gradient index lens.

20. An apparatus according to claim 17 wherein an interference band system is generated by spherical waves originating at the foci.

21. An apparatus according to claim 20 further comprising:
   a screen located at the focal plane of the lens between the lens and the interference band system.

22. An apparatus according to claim 21 wherein the screen only allows the first order (±1) of partial beams created by the interference to pass through to the detector.

23. An apparatus according to claim 20 further comprising a structured detector for detecting the interference band system.

24. An apparatus according to claim 2 wherein the light source and the detector are located in a plane at right angles to the measuring direction.

25. An apparatus according to claim 24 wherein the light source and the detector are located symmetrically to the normal of the scale grating.

26. An apparatus according to claim 2 wherein the light source and the detector are located in a plane defined by a component in the measuring direction and a component normal to the scale grating.

27. An apparatus according to claim 26 further comprising:
a beam splitter located in a beam path between the light source and the detector.

28. An apparatus according to claim 17 further comprising:
at least one wave guide mounted at the location of a foci; and
a 2×3 coupler coupled to the at least one waveguide.

29. A method for measuring displacement by diffracting a light beam of a particular wavelength comprising the steps of:
providing a scanning grating having a first division period greater than the wavelength of the light beam;
providing a scale grating having a second division period, the second division period being smaller than a wavelength of the light beam;
diffracting an incident beam of light by the scanning grating to generate first partial beams;
diffracting the first partial beams by the scale grating to generate second partial beams;
diffracting the second partial beams by the scanning grating to generate interference beams wherein temporal and spatial coherence properties of the incident light beam allow interference only of partial beams that travel equally long optical distances between the scanning and scale gratings and that are superimposed without offset in the measuring direction at the scanning grating after diffraction at the scale grating; and
detecting the interference beams and generating phase displaced signals.

30. A method according to claim 29 wherein a structured detector is used to detect the interference beams.

31. A method according to claim 29 wherein the scanning grating includes a splitting grating and a combining grating.

32. A method for measuring displacement by diffracting a light beam of a particular wavelength comprising the steps of:
providing a scanning grating having a first division period that is greater than the wavelength of the light source;
providing a scale grating having a second division period that is less than the wavelength of the light source;
diffracting an incident beam of light by the scanning grating to generate first partial beams;
diffracting the firs partial beams by the scale grating to generate second partial beams;
diffracting the second partial beams by the scanning grating to cause the second partial beams to interfere and generate interference partial beams; and
detecting an interference band system generated by the interference partial beams.

33. A method according to claim 32 further comprising the step of:
focusing the interfering partial beams with a lens onto a screen located at the focal plane of the lens to create a plurality of foci before detecting the interference band system.

34. A method according to claim 33 wherein the interference band system is generated by spherical waves originating at the foci.

35. The instrument according to claim 1 wherein the ratio of the second division period (TP2) to the first division period (TP1) is exactly 2:1.

36. The instrument according to claim 29 wherein the ratio of the second division period to the first division period is exactly 2:1.

* * * * *

UNITED STATES PATENT AND TRADEMARK OFFICE
CERTIFICATE OF CORRECTION

PATENT NO. : 5,424,833
DATED : June 13, 1995
INVENTOR(S) : Walter Huber et al.

It is certified that error appears in the above-indentified patent and that said Letters Patent is hereby corrected as shown below:

<u>In the Claims</u>
    Col. 7, line 67
    In claim 2, line 1, delete "claims" and substitute --claim--.
    Col. 10, line 1,
    In claim 29, line 20, delete "the" and substitute --a--.
    Col. 10, line 22,
    In claim 32, line 12, delete "firs" and substitute --first--.

Signed and Sealed this

Ninth Day of July, 1996

*Attest:*

BRUCE LEHMAN

*Attesting Officer*     *Commissioner of Patents and Trademarks*